United States Patent
Luckevich et al.

Patent Number: 6,161,907
Date of Patent: Dec. 19, 2000

[54] BRAKE CONTROL USING PROPORTIONAL PLUS INTEGRAL SLIP REGULATION AND PROPORTIONAL PRESSURE REGULATION

[75] Inventors: Mark S. Luckevich; Danny R. Milot, both of Ann Arbor, Mich.

[73] Assignee: Kelsey-Hayes Company, Livonia, Mich.

[21] Appl. No.: 09/383,769

[22] Filed: Aug. 26, 1999

Related U.S. Application Data

[63] Continuation of application No. PCT/US98/04197, Mar. 5, 1998.
[60] Provisional application No. 60/040,192, Mar. 5, 1997.

[51] Int. Cl.$^7$ ........................................................ B60T 8/66
[52] U.S. Cl. ........................................ 303/158; 303/139
[58] Field of Search ............................. 303/158, 139, 303/156; 188/181 C

[56] References Cited

U.S. PATENT DOCUMENTS

| | | | |
|---|---|---|---|
| 3,883,187 | 5/1975 | Carp et al. | |
| 3,967,862 | 7/1976 | Hunter et al. | 303/21 P |
| 4,783,127 | 11/1988 | Kade et al. | |
| 5,265,946 | 11/1993 | Bader | 303/96 |
| 5,492,394 | 2/1996 | Kusano et al. | 303/139 |
| 5,618,088 | 4/1997 | Roll et al. | 303/158 |

*Primary Examiner*—Michael Mar
*Assistant Examiner*—Devon Kramer
*Attorney, Agent, or Firm*—MacMillan, Sobanski & Todd, LLC

[57] ABSTRACT

A brake control system determines when a wheel is unstable or stable during a braking condition. An unstable wheel is determined when the wheel speed is different from the estimated vehicle speed by greater than a fixed amount. When the wheel is determined to be unstable, an amount of brake pressure reduction is determined according to a proportional-plus-integral compensation. The proportional-plus-integral compensation is a function of the difference between the wheel speed and the estimated vehicle speed, as well as a wheel deceleration value. When the wheel is determined to be stable, brake pressure is applied according to an exponential rate. A hold mode is entered when the wheel is determined to be no longer decelerating during a dump cycle.

7 Claims, 10 Drawing Sheets

BRAKE CONTROL USING PROPORTIONAL PLUS INTEGRAL SLIP REGULATION AND PROPORTIONAL PRESSURE REGULATION

CROSS REFERENCE TO RELATED APPLICATIONS

This application is a Continuation of International Patent Application PCT/US98/04197, filed Mar. 5, 1998 and which designated the United States, which was a Continuation of U.S. Provisional Application 60/040,192 filed on Mar. 5, 1997.

BACKGROUND OF THE INVENTION

The invention relates to an apparatus and method for providing anti-lock brake control. In particular, the invention relates to an apparatus and method for dumping and applying brake pressure at particular rates based on whether a wheel is in a stable or unstable condition.

Pressure control systems are necessary in order to control an amount of brake pressure to be applied and to be dumped from brake systems. Pressure control is used for electro-hydraulic brake (EHB) systems, which can also perform the control functions used for anti-lock brake systems (ABS), traction control systems (TC), and vehicle stability control systems (VSC).

A block diagram of a conventional braking system for a vehicle is shown in FIG. 1. Such a system is described in U.S. Pat. No. 5,551,769, issued to Mark Luckevich, and which is incorporated herein by reference. The conventional braking system is a hydraulic system, and includes a brake pedal 212, a brake switch 213, a brake master cylinder 214, control valves 216, brake fluid conduits 218, 220, 222, 224 and 226, as well as a right front wheel 228 and a left front wheel 230, and a pair of rear wheels 232.

The conventional system includes a pair of vehicle wheel speed sensors 234 for measuring the speed of each of the front wheels 228 and 230, and a pair of vehicle wheel speed sensors 236 for measuring the speed of each of the rear wheels 232. The system further includes an anti-lock brake system control unit 238. Each of the wheel sensors 234 and 236 are operatively connected to the control unit 238, which is itself operatively connected to the anti-lock brake system control valve 216, via an electrical or fiber optic connection.

In conventional braking systems, such as that shown in FIG. 1, the driver input is through the brake pedal 212 to the master cylinder 214. This is a mechanical system in which the brake command and power is provided by the mechanical motion of a master cylinder piston acting on the brake fluid. The pressure is then boosted (usually with a vacuum system) and actuated through the fluid to the brake calipers and rotors.

Conventional anti-lock brake systems determine a reference vehicle speed based on the measured wheel speeds for each wheel of the vehicle. The measured wheel speeds can be determined by several different methods. One method, for example, is to count a number of pulses for a given period of time, where each pulse corresponds to a predetermined position on a wheel passing through a predetermined reference location. Based on the measured wheel speeds for each wheel and the estimated vehicle speed, it can be determined if any of the wheels are departing from the estimated vehicle speed, thereby signifying a potential wheel slippage condition.

That is, when one applies brakes on a road surface in which some or all of the wheels are slipping excessively (i.e., traveling at slower than the vehicle speed), the anti-lock brake system should activate, in which case the brakes are pumped at a very fast rate so as to provide controlled braking.

FIGS. 2A–2C show a condition in which brake pressure is applied and then dumped, based on the difference between the wheel speed and the estimated vehicle speed. In each of FIGS. 2A–2C, the x-axis corresponds to the same passage of time. During normal conditions, the wheel speed 210 for each wheel should closely approximate the wheel speed reference 220. However, during braking, when the applied brake force exceeds the adhesion capabilities of the road surface, some or all of the wheels may lock, causing the measured wheel speed 210 for the locked wheel to depart from the wheel speed reference 220 by more than a fixed value $\alpha$. That "departure" is shown as area 201 in FIG. 2A, and when the departure occurs, an ABS_ACTIVE flag 225 is set to an active (high) state, as shown in FIG. 2B, so as to enter the ABS mode.

During the departure period (area 201), the brake pressure for each wheel experiencing a departure has to be dumped, in order to lessen the amount of brake pressure applied at that time. The lessening of the amount of brake pressure is performed in a step-wise fashion, where the width of the steps and the height of the steps can be adjusted.

Due to the dumping of the brake pressure, at some later point in time, the measured wheel speed should closely match the estimated vehicle speed, assuming the anti-lock braking system is functioning properly. During that period, shown as area 203 in FIG. 2A, the brake pressure is reapplied in a stepwise fashion, where the size and width of the steps are adjustable. The stepwise brake pressure apply and stepwise brake pressure dump are shown in FIG. 2C, for a conventional anti-lock brake system.

In FIG. 2C, $P_{M/C}$ 230 corresponds to a desired brake pressure of the operator (e.g., the amount of travel of the brake pedal and/or the amount of force applied to the brake pedal), and $P_{brake}$ 240 corresponds to an actual brake pressure at the brakes. $P_{brake}$ 240 becomes different from $P_{M/C}$ 230 due to the activation of the ABS system, in which dumping and applying of brake pressure in order to achieve a controlled stop is effected.

In conventional systems, the height and width of the dump pulses (i.e., the amount of dumping for a given period of time) is determined by the wheel departure characteristics. An open loop control is used in which dump pulses occur when a threshold $\alpha$ is passed and continue until the wheel begins to accelerate out of the departure. The pulse width and pulse frame (or duty cycle) are often modified based on the wheel departure characteristics. The brake pressure is reapplied in a stepwise manner as long as the operator is applying the brakes. However, if the measured wheel speed departs again from the estimated vehicle speed, another dumping of brake pressure will take place, followed by another apply cycle. This process may continue for as many cycles as needed, until the vehicle braking has been stabilized or until the operator has let off of the brake pedal.

With the above-mentioned conventional brake apply and dump system, during the dump period, the dumping is based on the amount of difference of the measured wheel speed with respect to the estimated wheel or vehicle speed, and other parameters derived from the wheel speed in order to optimize the rate of dumping.

SUMMARY OF THE INVENTION

An object of the present invention is to provide a dumping and apply brake pressure scheme that utilizes proportional pressure control and allows for better control of the vehicle over that provided by conventional systems.

Another object of the present invention is to use closed loop slip regulation to control the pressure dumping during a wheel departure.

Another object of the present invention is to achieve a smoother pressure control over conventional systems.

A further object of the present invention is to have improved braking performance over conventional systems.

A still further object of the present invention is to have a reduction in audible noise due to braking.

To achieve these and other objects, the invention is directed to a method for brake control. The method includes a step of determining a wheel speed for each wheel of a vehicle, and a step of estimating wheel speed references and a vehicle speed based on the measured wheel speeds. The method also includes the step of determining when brakes are activated by a user of the vehicle. The method further includes the step of determining when the wheel speed for at least one of the wheels of the vehicle is different from the estimated wheel speed by at least a fixed amount. The method also includes the step of, when the wheel speed for at least one wheel is determined to be different by at least the fixed amount when the brakes are activated by the user, lessening an amount of brake pressure applied to brakes for at least one wheel according to a proportional plus integral control. The method still further includes the step of, when the wheel speed for at least one wheel is determined to not be different by at least the fixed amount when the brakes are activated by the user, applying brake pressure at an exponential rate.

The invention may further include the step of estimating a wheel deceleration for each wheel based on the measured wheel speed. The proportional control is based on an amount of the difference between the wheel speed and the estimated vehicle speed for the at least one wheel, and the estimated wheel deceleration for the at least one wheel. The integral control is based on the amount of difference between the wheel speed and the estimated vehicle speed for the at least one wheel.

BRIEF DESCRIPTION OF THE DRAWINGS

These and other objects and advantages of the invention will become more fully apparent from the following detailed description when read in conjunction with the accompanying drawings with like reference numerals indicating corresponding parts throughout, and wherein.

DETAILED DESCRIPTION OF THE PREFERRED EMBODIMENTS

Preferred embodiments of the invention will be described herein with reference to FIGS. 3–8. In each of FIGS. 4A–4E, the x-axis corresponds to the same passage of time; in each of FIGS. 5A–5F, the x-axis corresponds to the same passage of time; and in each of FIGS. 6A–6C, the x-axis corresponds to the same passage of time.

Figure 1:
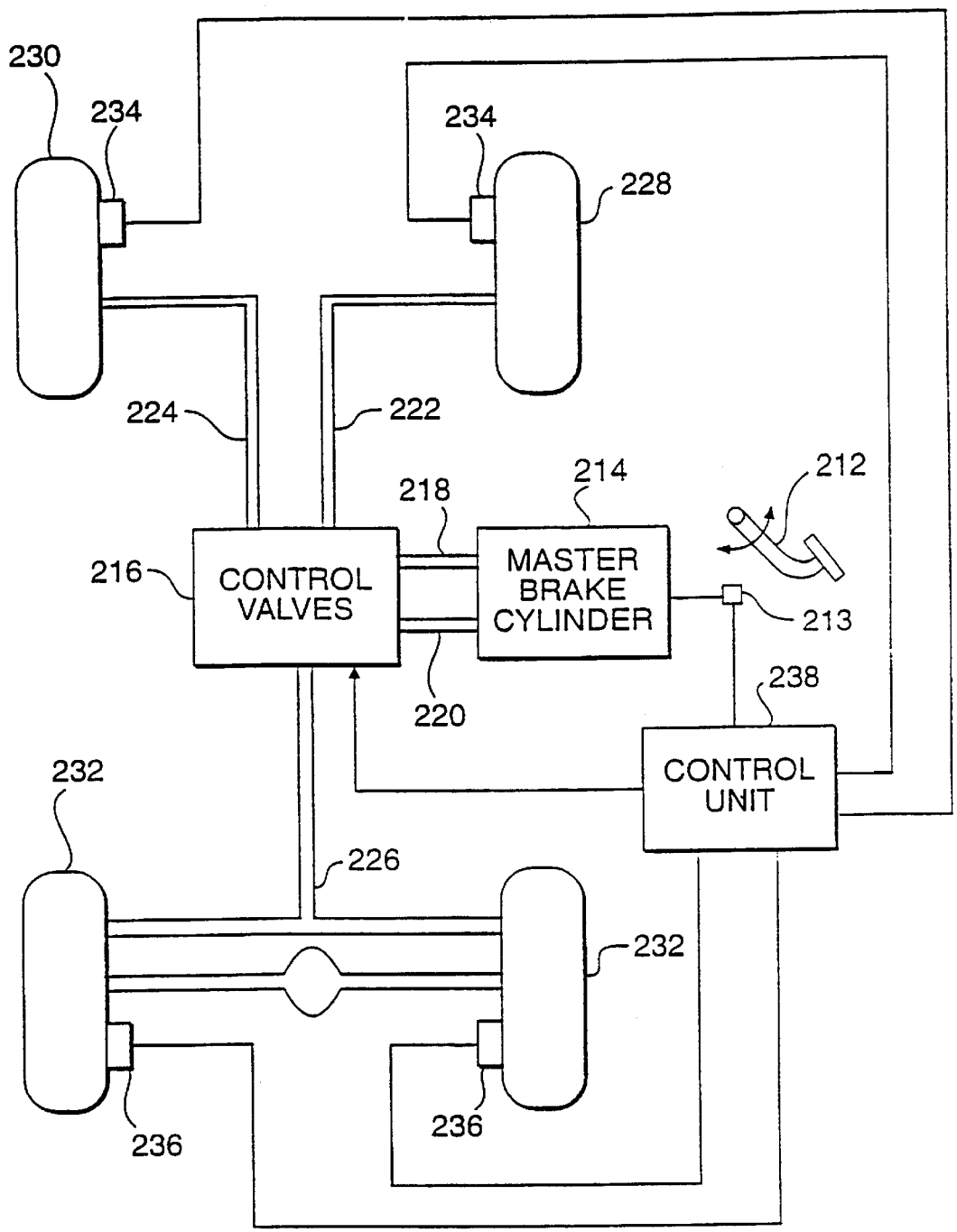
FIG. 1 shows a conventional electro-hydraulic brake control system.
Figure 2A:
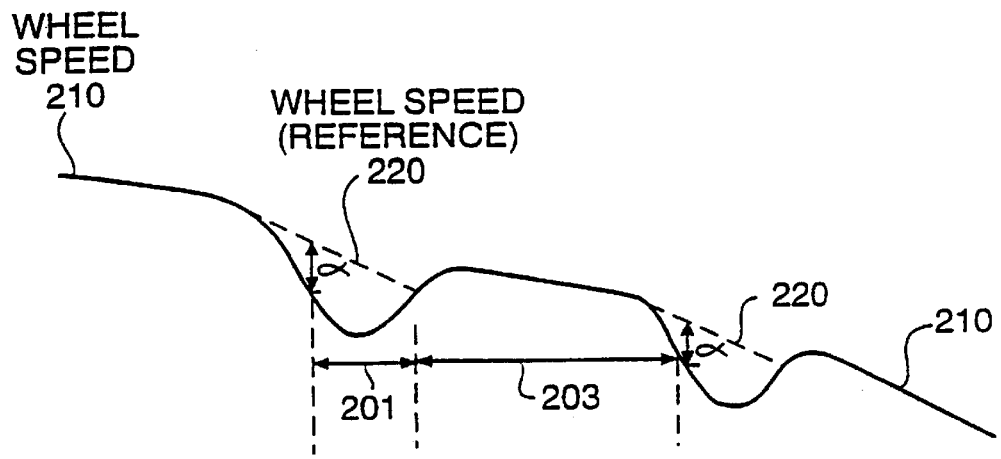
FIGS. 2A–2C illustrate brake pressure, wheel speed and vehicle speed curves, as well as the step-wise fashion at which the pressure is dumped during a dump pressure period, and the step-wise fashion at which the pressure is applied during an apply pressure period, in a conventional anti-lock brake system.
Figure 2B:
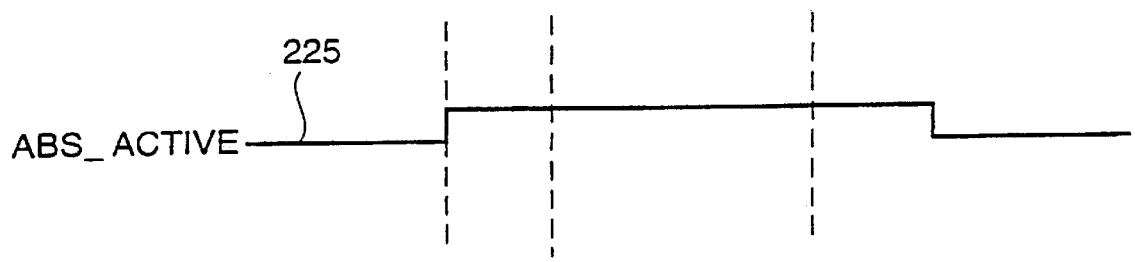
Figure 2C:
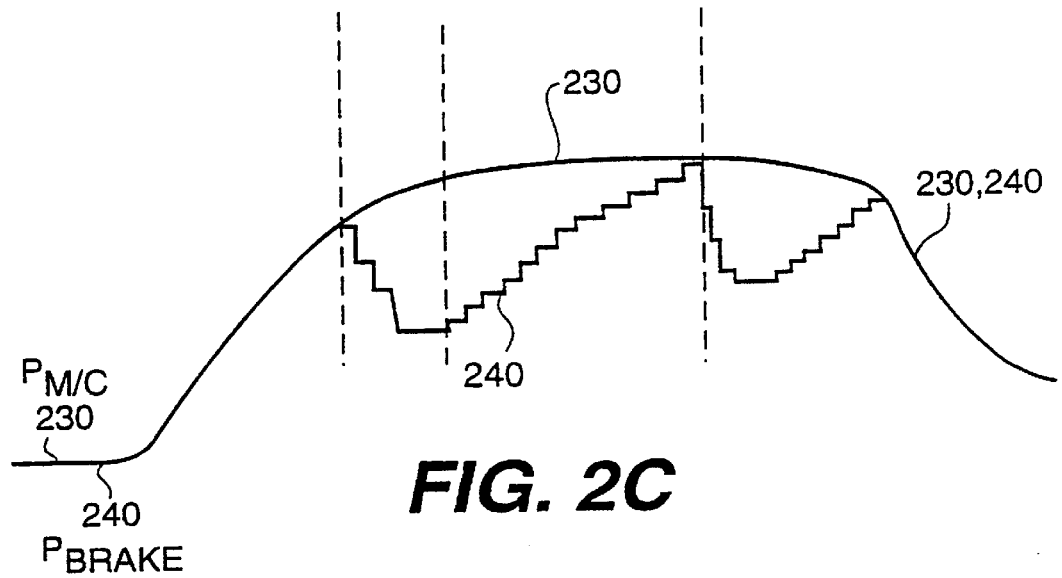
Figure 3:
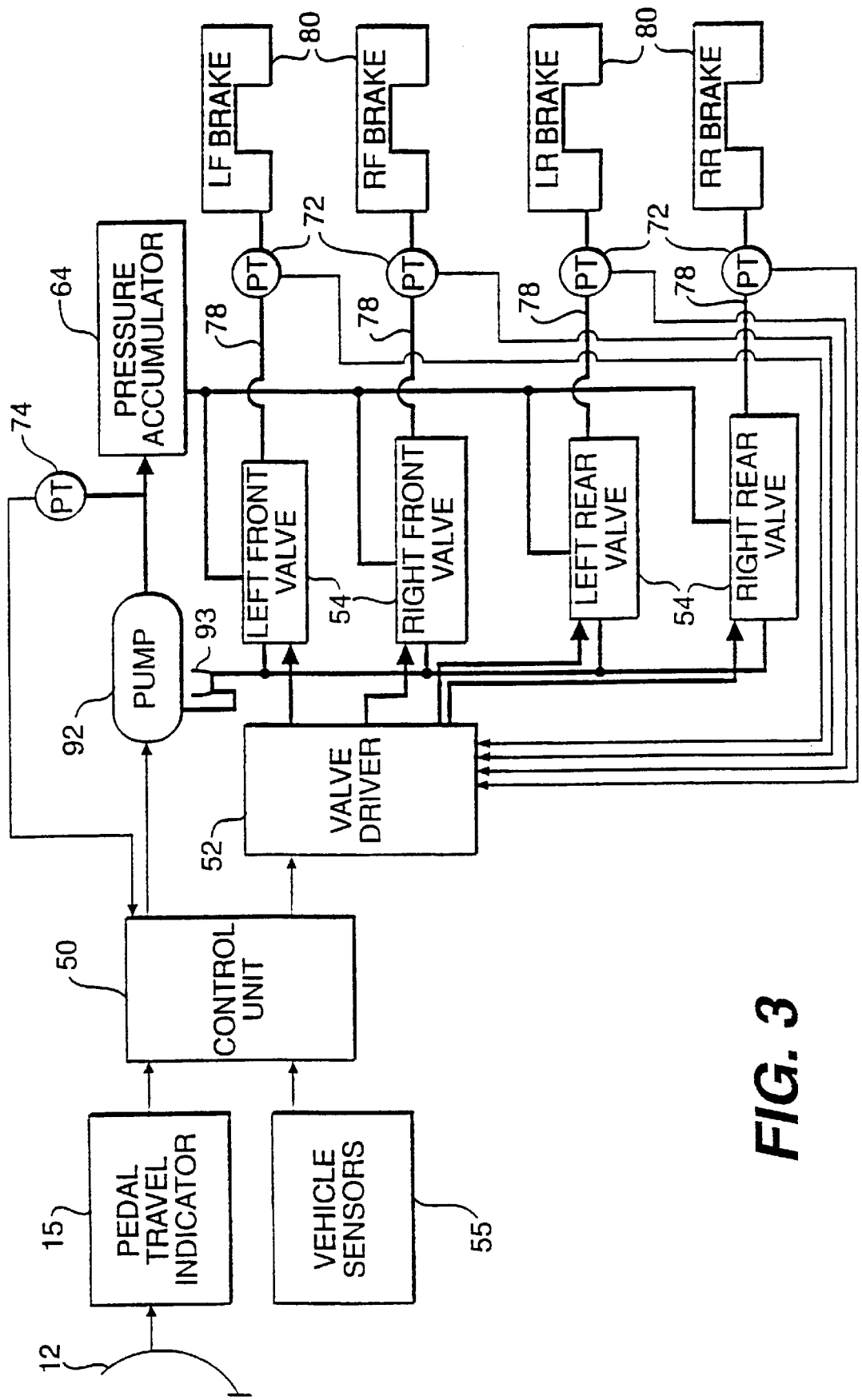
FIG. 3 shows an electronic brake management system according to the invention.

FIG. 3 shows a braking system for an electronic brake management (EBM) system according to the invention. In an EBM system, the brake command, which is based on the desired amount of braking as determined by pedal movement and force, is translated to brake torque at the brake calipers with an electro-hydraulic system. High fidelity proportional pressure control valves are used to apply and modulate the brake pressure. Hydraulic power is supplied by a pump and a charged pressure accumulator (CPA). In a BBW system, all of the braking force is generated by an "electric caliper." Thus, in both systems, brake control is done electronically, where the major differentiating factor is that the EBM system maintains a hydraulic subsystem (or a "wet" system) and the BBW system is purely electronic (or "dry" system).

In FIG. 3, movement of a brake pedal 12 is detected by a pedal travel and force indicator 15, which outputs a signal indicating an amount of brake travel and force to a Control Unit 50. Other vehicle sensors 55 also supply inputs to Control Unit 50, such as wheel speed, amount of movement of the steering wheel, etc.

Control Unit 50 outputs a control signal to a Valve Driver 52, so as to place Valves 54 in a state such that a desired amount of brake pressure is supplied from the Charge Pressure Accumulator (CPA) 64 and is applied to Brake Calipers 80. Each wheel of the vehicle has a Pressure Transducer (PT) 72 and a Brake Caliper 80, as shown in FIG. 3. Each valve 54 is independently controlled by a respective signal received from Valve Driver 52. Pressure transducers (PT) 72 measure an amount of actual brake pressure at the Brake Calipers 80, and these measurements are fed back as feedback signals to the Valve Driver 52. Using these feedback signals, Valve Driver 52 provides closed loop pressure compensation to eliminate pressure command error so as to achieve the desired amount of braking pressure.

Pressure transducers 72 may be located either nearby the valve driver 52 or nearby the brake calipers 80. If the pressure transducers 72 are located nearby the valve driver 52, then an amount of brake pressure at the brake calipers 80 is estimated based on the brake line length from the pressure transducers 72 and the brake calipers and the measured brake pressure at the pressure transducers 72. Alternatively, if pressure control valves are used for valves 54, then there is no need for pressure transducers, as the loop compensation is done hydraulically. In an alternative embodiment, the valve drivers are included in the control unit 50.

Valves 54 are driven by respective signals that correspond to a difference between the respective control signal and the respective feedback signal. Control unit 50 also supplies signals to a Pump 92, which is used to supply hydraulic fluid to CPA 64. CPA 64 outputs fluid under pressure to input ports of Valves 54. A pressure transducer 74 provides a signal to the Control Unit 50 that is indicative of a current pressure in CPA 64.

Also shown in FIG. 3 is a low pressure port for each of the valves 54, whereby when a reduction in pressure is needed, fluid goes out of the low pressure ports of the valves 54 to a reservoir 93, thereby lessening the pressure in the hydraulic lines 78. The fluid collected in the reservoir 93 is used to replenish the CPA 54 via the Pump 92.

In the system shown in FIG. 3, Control Unit 50 provides an output signal to Valve Driver 52 based on the output by a particular control system, such as a vehicle stability control (VSC), traction control (TC), anti-lock brake (ABS), or base brake control (BBC) system.

In the system according to the invention, a brake pressure control system inputs vehicle information and wheel specific information, and determines when and at what rate to control the brake pressure. The brake pressure control system utilizes wheel specific and vehicle information in order to compute a voltage command, which is used to control wheel pressure. In the preferred embodiment, a voltage command controls wheel pressure through the activation of a pressure control valve (PCV) at each wheel. The voltage command is modified as a function of the wheel dynamic response, such that if the wheel speed response is determined to be unstable, then the driver commanded braking voltage is modified so that a pressure reduction results, thereby stabilizing the transient response of the unstable wheel.

For each wheel, the wheel pressure control system calculates a commanded voltage, $V_{BRAKE}$, that is used to generate wheel pressure through a PCV actuator. The command voltage V is defined by the following equation:

$$V_{BRAKE} = V_{cmd} - \Delta V$$

$V_{BRAKE}$ is either a voltage $V_{BBW}$ that directly corresponds to an amount of braking desired by an operator of the vehicle (i.e., based on an amount of travel of the brake pedal), or is a lesser controlled voltage that indicates a stability control voltage for the surface conditions. If ABS is inactive, then $V_{BRAKE} = V_{BBW}$ and $\Delta V = 0$, and therefore $V = V_{BBW}$, as desired.

If ABS is active, then a reference voltage $V_{cmd}$ is held at a constant value that is captured at a time when a wheel is initially determined to be slipping. This is determined to be the wheel departure pressure. As seen in FIGS. 4C and 4D, $P_{cmd}$ 333 (and thus $V_{cmd}$, which is directly related to $P_{cmd}$ 333) is set to a value of $V_{BRAKE}$ 340 at a point when ABS_SLIP 325 transitions to the active state.

If the ABS system is active, $\Delta V$ is computed by one of two functions, depending upon whether the wheel is determined to be stable or unstable. When ABS is active and when a wheel is unstable, the system controls wheel instability transients with a pressure reduction and reapplies wheel pressure in a controlled manner to maintain a desired wheel deceleration and smoothness of operation. Furthermore, the final computed voltage command, $V_{BRAKE}$, is limited to being no greater than $V_{BBW}$, the driver commanded voltage. When the wheel is determined to be stable for a predetermined period of time, then $V_{BRAKE}$ is linearly increased at a particular rate up to but not exceeding $V_{BBW}$.

Figure 4A:
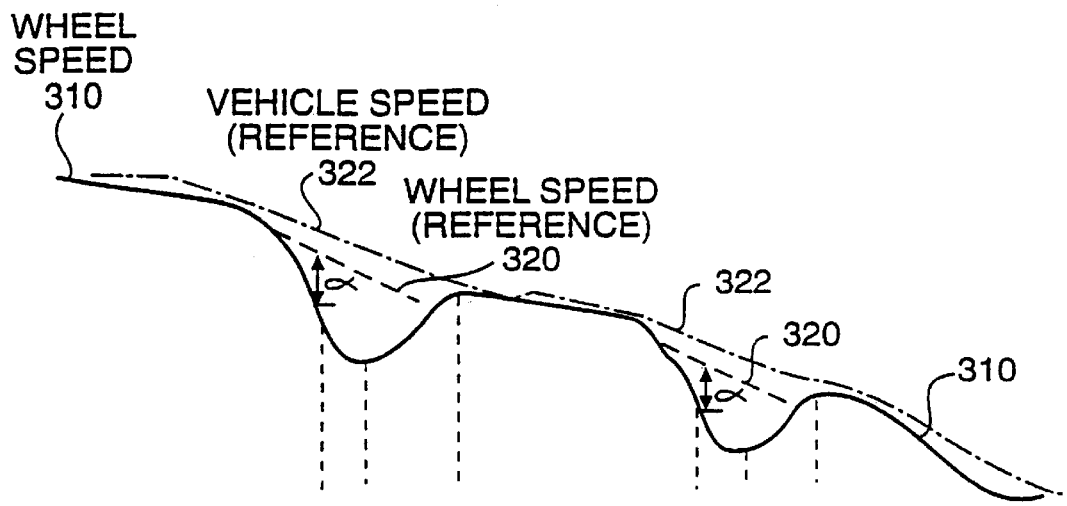
FIGS. 4A–4E illustrate brake pressure, wheel speed and vehicle speed curves, as well as the rate at which brake pressure is applied and is dumped in the system and method according to the invention.
Figure 4B:
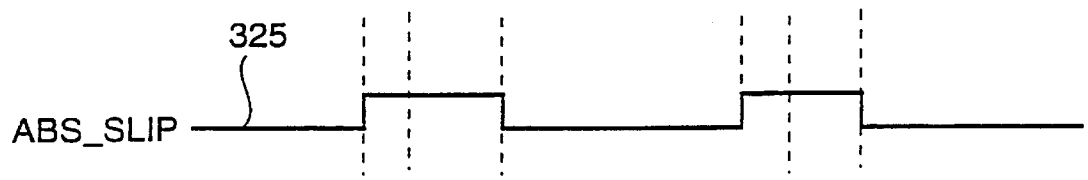
Figure 4C:
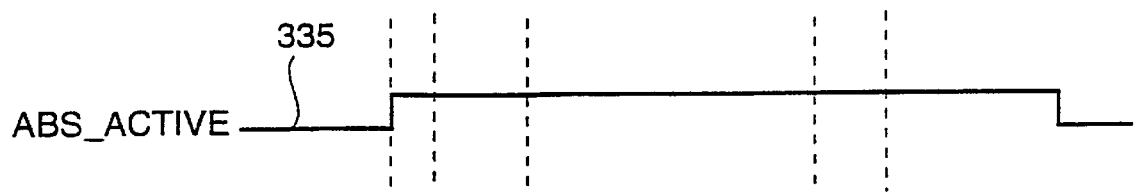
Figure 4D:
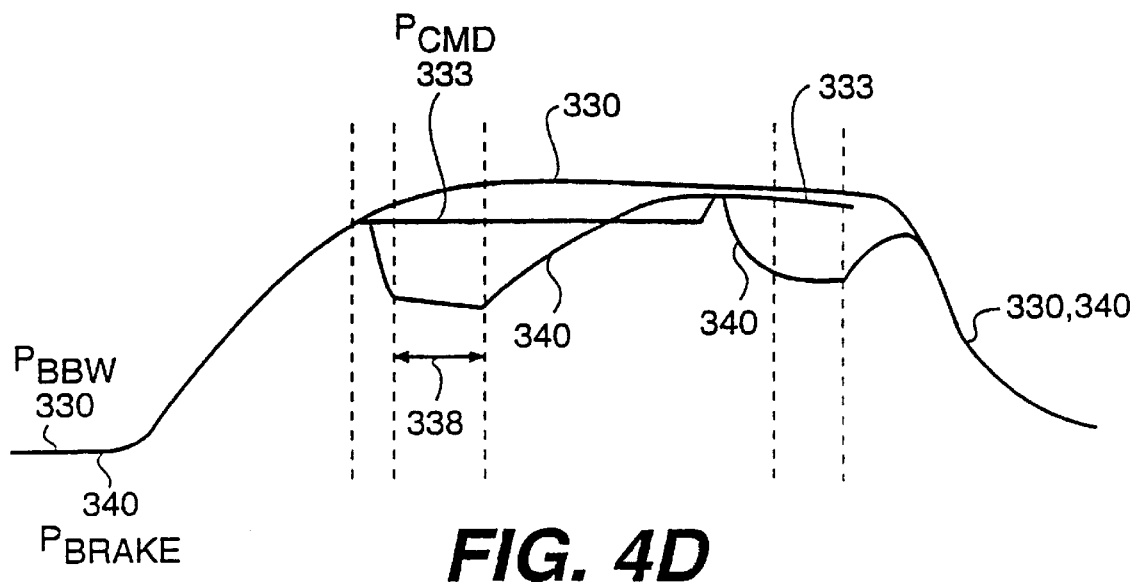

In FIG. 4A, when the measured wheel speed 310 for a wheel is different from the estimated wheel speed 320 by a fixed amount, α, that event causes an ABS_SLIP 325 and ABS_Active flag 335 to be set to an active "high" (or alternately, an active "low") state, as seen in FIGS. 4B and 4C, which invokes the ABS control. As long as the measured wheel speed 310 for the wheel is different from the estimated wheel speed 320 by at least the fixed amount α, the wheel is considered to be "unstable", and an ABS_SLIP flag 325 for that wheel is set to an active "high" (or alternatively, an active "low") state, as seen in FIG. 4B.

Figure 4E:
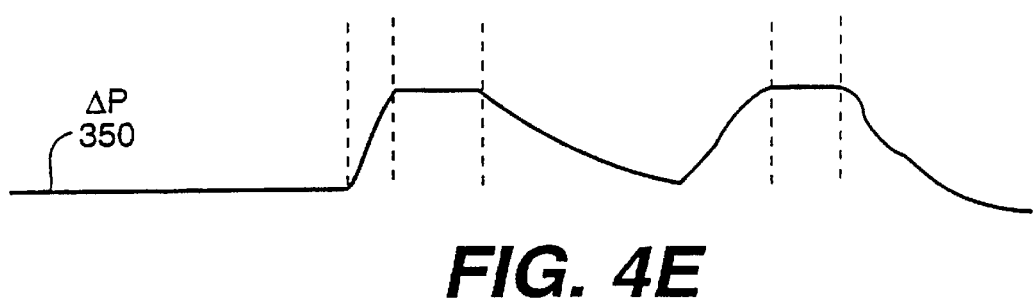
Figure 5A:
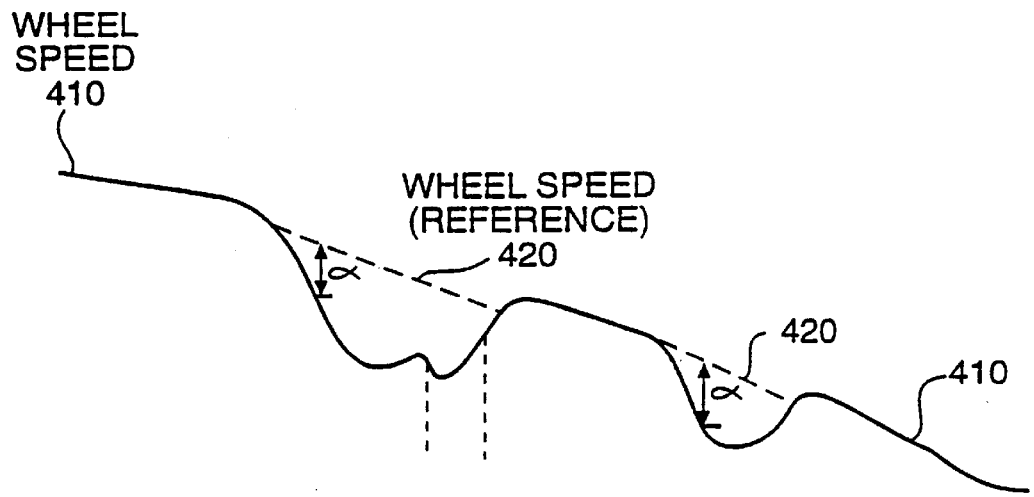
FIGS. 5A–5F illustrate brake pressure, wheel speed, vehicle speed and wheel deceleration curves, which are used to determine when a hold cycle is entered in controlling brake pressure in the system and method according to the invention.
Figure 5B:
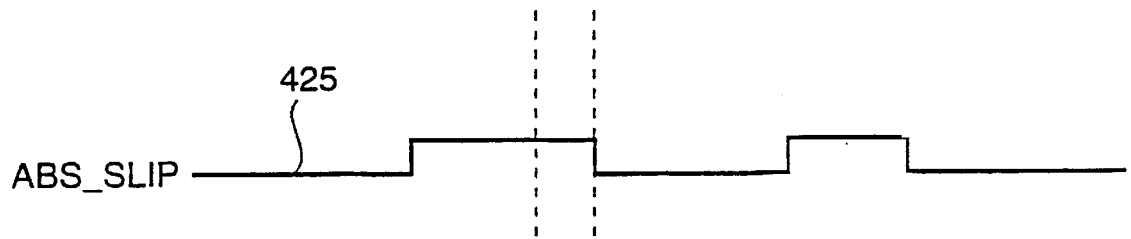
Figure 5C:
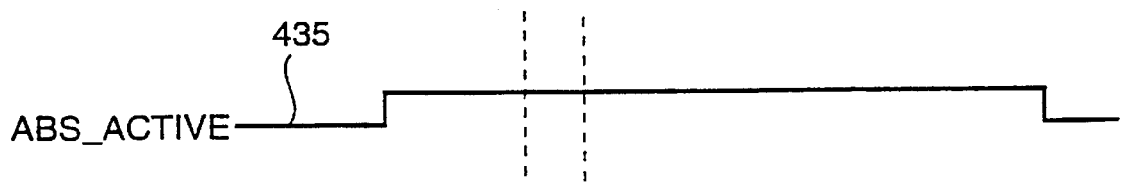
Figure 5D:
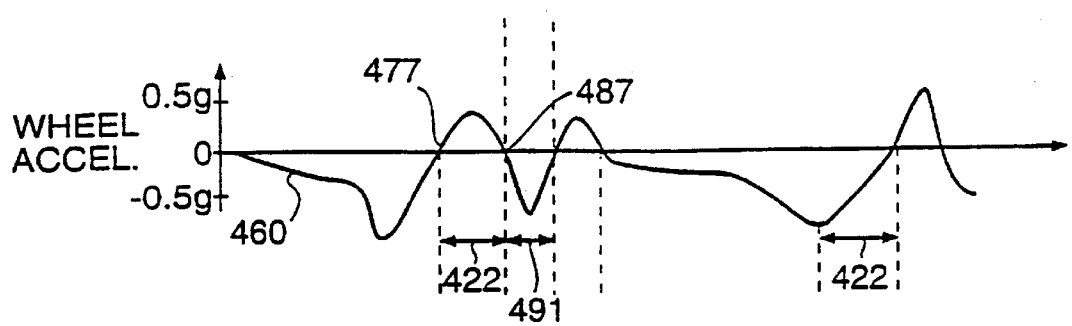
Figure 5E:
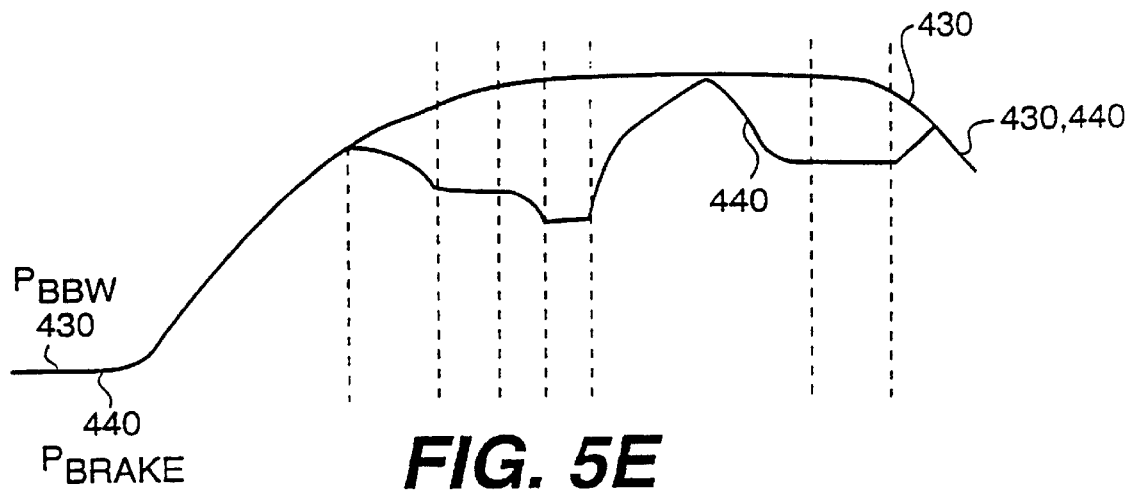
Figure 5F:
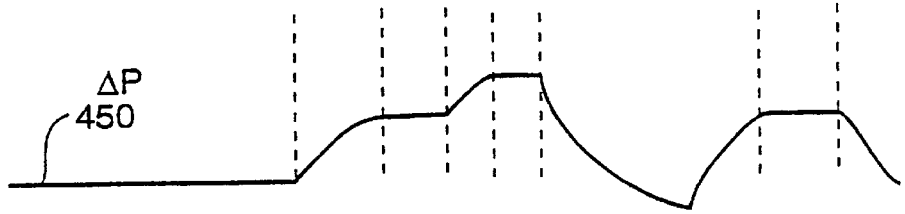

During the time when the ABS_SLIP flag 325 is in the "active" state for a particular wheel and the wheel is decelerating, brake pressure is dumped from the brake line for that wheel, which corresponds to a "dump" cycle. Once the wheel starts to accelerate out of the departure (due to the pressure dump), a pressure hold mode 338 is initiated. The amount and rate of dumping is in accordance with a proportional plus integral (PI) regulation when the wheel is unstable. In particular, the amount of dumping of brake pressure is done in accordance with the following equation:

$$\Delta P = (e_{slip} * k_p + e_{decel} * k_d) + \Sigma e_{slip} * k_i$$

where $\Delta P$ is the amount of brake pressure to be dumped, $e_{slip}$ is the difference between the wheel speed and the estimated vehicle speed, $k_p$ is a constant (adjustable gain) used in the proportional term, $e_{decel}$ is the difference between the measured amount of deceleration of the wheel and the estimated vehicle deceleration, $k_d$ is a constant (adjustable gain) used in the proportional term, and $k_i$ is a constant (adjustable gain) used in the integral term. The measured amount of deceleration of a wheel is obtained by taking a derivative of the measured wheel speed for that particular wheel. The estimated vehicle speed is obtained from the measured wheel speed of each of the wheels of the vehicle; i.e., an average of those values. The estimated vehicle deceleration is obtained by taking a derivative of the estimated vehicle speed. FIG. 4E shows $\Delta P$ 350, which corresponds to the change is brake pressure as caused by the ABS system. An increasing $\Delta P$ corresponds to a dump period, while a decreasing $\Delta P$ corresponds to an apply period. When $\Delta P$ equals zero, then ABS is inactive, and when $\Delta P$ is not equal to zero but is held constant, that corresponds to a hold period, which will be discussed in more detail.

In the system according to the invention, there is a PI compensation brake pressure controller for each wheel, so that for each wheel, independent brake pressure control will be occurring during ABS.

Figure 8:
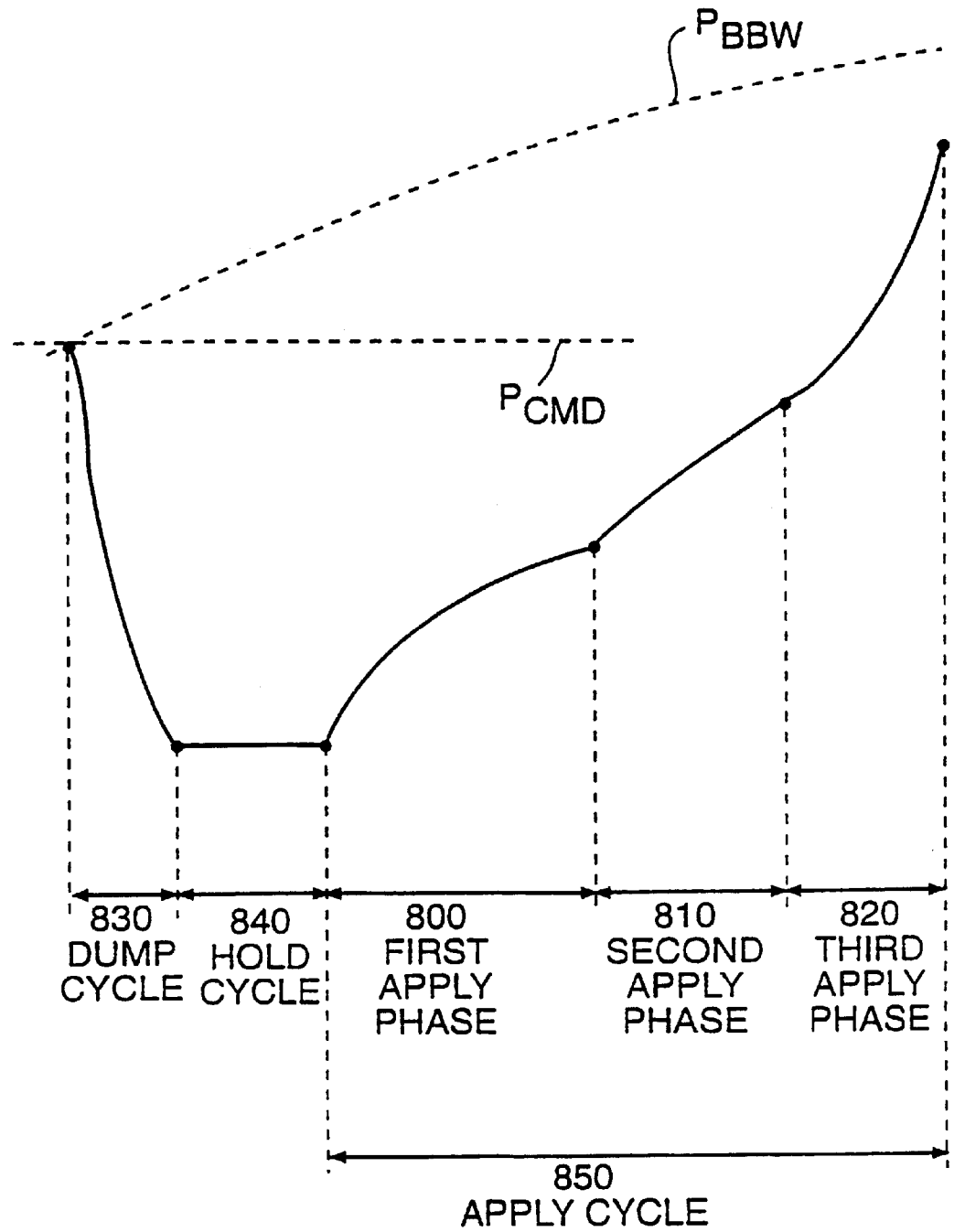
FIG. 8 is a diagram showing the three possible apply phases in the system according to the invention.

During the time when the ABS_SLIP flag 325 is in the "inactive" state for a particular wheel when the operator is applying brakes, the wheel is determined as being stable. During that time, brake pressure is applied to the brake line for that wheel, which corresponds to an "apply" cycle. The amount and rate of application of brake pressure is controlled at an exponential rate during a first phase of an apply cycle, as explained below. The exponential apply response is chosen to give a desired deceleration and smoothness of braking. Furthermore, a second phase of an apply cycle, in which brake pressure is controlled at a linear rate, and a third phase of an apply cycle, in which brake pressure is controlled at a faster exponential rate than the first phase, may also be required. FIG. 8 shows a dump cycle 830, a hold cycle 840, and an apply cycle 850. Apply cycle 850 includes a first apply phase 800, a second apply phase 810, and a third apply phase 820. Note the continuity between the apply amount at the end of one apply phase and the beginning of another apply phase.

The first apply phase is described hereinbelow. Referring to FIG. 4B, when ABS_SLIP flag 325 transitions from "active" to "inactive" (i.e., wheel just becomes stable), the commanded voltage $V_{BRAKE}$ at the moment ABS_SLIP transitions from active to inactive is used as the initial condition, y(0), for the reapply pressure control. The final condition is the voltage reference $V_{cmd}$. Using these two values, $\Delta V$ (and thus $\Delta P$, which varies linearly with $\Delta V$) is reduced according to an exponential function during the apply mode, thereby increasing pressure to the brakes (since $V=V_{cmd}-\Delta V$). $\Delta V$ is derived as follows:

$$Y=V_{cmd}-Ae^{-at}$$

$$y(0)=y_0=V_{cmd}-A$$

$$Y=V_{cmd}-V_{cmd}*e^{-at}+y_0e^{-at}$$

$$Y=V_{cmd}(1-e^{-at})+y_0*e^{-at}$$

$$\Delta V=V_{cmd}-Y=V_{cmd}*e^{-at}-y_0e^{-at}$$

In order to implement this response in a discrete time system, the function $e^{-at}$ must be defined as a discrete function. For example, the function $f(k)=(\lambda)^k$ has an exponential response if $\lambda$ is less than 1, and the smaller the value $\lambda$, the faster the exponential response.

In the preferred embodiment, the final computation of brake pressure by the PI routine used during a dump cycle is used to determine the value for $\lambda$, the exponential rate gain. The amount of the apply rate is also based on a maximum wheel acceleration (a computed value that is derived from the estimated wheel acceleration), in order to determine a gain for the exponential rate factor $\lambda$. That is, based on the maximum wheel acceleration, the rate at which the brake pressure is applied is modified accordingly, with the initial condition (previously commanded voltage $V_{BRAKE}$) and the final condition ($V_{cmd}$) remaining the same.

The computation for $\lambda$ is completed once per departure on the transition from ABS_SLIP 325 being active to ABS_SLIP 325 being inactive. Once the computation is complete, the value is held at a constant until the next departure.

The first apply cycle ends when either: a) the difference between the measured wheel speed and the wheel speed reference is greater than the fixed amount (at which point the system goes back to the "dump" cycle), or b) the pressure command signal (which corresponds to an amount of braking desired by the operator as measured from the travel of the brake pedal) and the actual pressure at the brake are within a fixed amount with respect to each other, such as 5 bar, for example, c) a first fixed time period has been exceeded, in which case the second apply cycle is entered, or d) the operator has released the brake pedal.

The second apply phase corresponds to an open loop fixed apply rate limited to $P_{BBW}$. That is, a linear apply is performed in the second apply phase. For example, for each loop, the current voltage is made equal to the voltage of the last loop+X, where X is a constant. This allows for a linear increase in the pressure. As shown in FIG. 8, the starting pressure value in the second apply phase corresponds to the ending pressure value of the first apply phase.

The second apply phase is maintained until either: a) the difference between the measured wheel speed and the wheel speed reference is greater than the fixed amount (at which point the system goes back to the "dump" cycle), or b) the pressure command signal (which corresponds to an amount of braking desired by the operator as measured from the travel of the brake pedal) and the actual pressure at the brake are within a fixed amount with respect to each other, such as 5 bar, for example, c) a second fixed time period has been exceeded, in which case the third apply cycle is entered, or d) the operator has released the brake pedal.

The third apply phase corresponds to an exponential apply scheme, but at a faster rate than the rate in the first apply phase. This may be implemented as an apply rate corresponding to $ka^2$, where k is a constant, and where a is the apply time. In the third apply phase, the pressure command signal, $P_{BBW}$, is the target. As shown in FIG. 8, the starting pressure value of the third apply phase corresponds to the ending pressure value of the second apply phase ended.

As can be seen from the PI equation used for the dump cycle, the proportional term includes an error value, $e_{slip}$, which corresponds to a difference between the measured wheel speed and the estimated vehicle speed. The value $e_{slip}$ is multiplied by a constant, $k_p$, so as to arrive at a first proportional term that is based on the difference value between the measured wheel speed and the estimated vehicle speed. The proportional term also includes a wheel deceleration error value, e which corresponds to the derivative of the measured wheel speed. The value $e_{decel}$ is multiplied by a constant, $k_d$, so as to arrive at a second proportional term that is based on the wheel deceleration. The first and second proportional terms are added together to obtain the proportional term.

The integral term corresponds to the integration of $e_{slip}$ during the dump cycle, as well as a constant, $k_i$, which is multiplied with $e_{slip}$. The proportional plus integral terms are added together, to obtain an amount of dumping, or $\Delta P$, for a particular time during the dump cycle.

Thus, in the system according to the invention, feedback is provided during the dump cycle, so as to allow for a better brake pressure control during the dump cycle than that performed in conventional systems, which typically used a dump pulse of a particular amount every 10 msec or so. In the system according to the invention, however, brake pressure is continually changed based on error signals that are based on wheel speed, vehicle speed, and wheel deceleration.

The proportional term during a dump cycle is augmented by a wheel deceleration term, as given above. Typically, a standard car can only decelerate at about 1 g (9.8 m/sec$^2$) or less. If a wheel is decelerating at a rate greater than 1 g, than this is strong evidence that wheel is becoming unstable (since the vehicle is highly unlikely to be decelerating at this rate). Accordingly, the dump amount is computed based on how much slip there is (i.e., first proportional term) and how much deceleration there is (i.e., second proportional term), so as to obtain a desired amount of dumping of brake pressure at all times during a dump cycle.

In the system according to the invention, the wheel deceleration is also monitored to determine if a "hold" mode should be entered. That is, while the wheel is determined to be slipping, and thus a dump cycle is being performed, if the calculated wheel deceleration is greater than zero (i.e, the wheel is accelerating), this is an indication that the wheel is no longer decelerating, and so the ABS system for that wheel goes into the hold mode, in which brake pressure is neither applied nor dumped from the brake line for that wheel.

FIGS. 5A–5F show the entering of the hold mode from a dump mode at a point 477 (see FIG. 5D) at which time the wheel acceleration 460 has become positive. The hold mode is shown as areas 422 in FIGS. 5D–5F. If the wheel acceleration 460 becomes negative again (point 487 in FIG. 5D) before the wheel has recovered (i.e., ABS_SLIP is still equal to 1), the hold mode is ended, and the dump mode is reentered (area 491 in FIGS. 5E and 5F), since the wheel speed 410 is still different from the wheel speed reference 420 by a value greater than a predetermined value $\alpha$. If the wheel speed 410 happened to have been within $\alpha$ of the wheel speed reference 420 at the point 487, then the apply mode would have been entered from the hold mode.

The hold mode is utilized to stop excessive dumping when the wheel is determined to be in recovery. The hold mode entered when there is evidence of a wheel recovery from a slippage condition. One way of detecting wheel recovery is when the wheel is no longer decelerating or is starting to accelerate (i.e., wheel deceleration is greater than zero). Another way of detecting wheel recovery from the wheel deceleration signal is to capture the maximum wheel deceleration during the departure and compare the actual value to the captured value. If the actual value is less negative than the captured value by a certain amount, than this is an indication that enough wheel pressure has been removed and the hold mode can be initiated.

When wheel recovery has been detected during a dump cycle, there is no need to dump any more brake pressure, and the system goes to the hold mode from the dump mode. After exiting the hold mode (due to wheel deceleration being less than zero), the system may go into either the dump mode or the apply mode, based on whether the wheel is determined to be stable or unstable, as explained above.

As explained earlier, the pressure dump command is made up of three components:

$$\Delta P = (e_{slip}*k_p + e_{decel}*k_d) + \Sigma e_{slip}*k_i$$

The second term, or wheel acceleration term, can cause pressure applies to occur during departures.

When the deceleration is reducing past its peak value, the wheel may not yet be accelerating, and thus the hold mode is not yet active. The changing wheel acceleration signal can then modify the overall pressure dump command signal and result in a pressure apply. At times this response can be favorable, but can also present a problem that needs to be rectified (i.e., adding pressure could prolong the wheel instability at this point).

Some of this problem is also due to the phase lag in the wheel acceleration signal from a low pass filter used in calculating that signal.

Figure 6A:
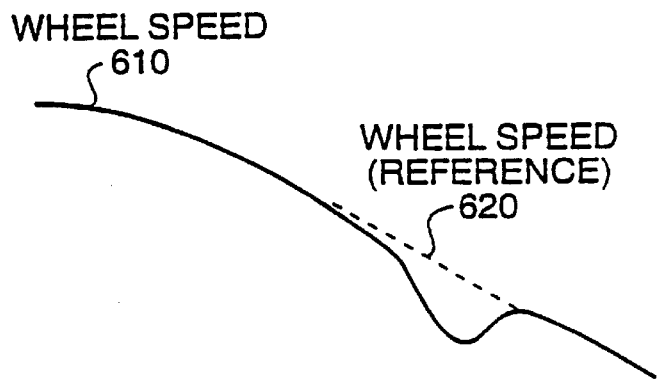
FIGS. 6A–6C illustrate a case where a problem may occur during a dump mode when a wheel acceleration is increasing but is still below zero, and where a maximum capture value is used to alleviate this problem.
Figure 6B:
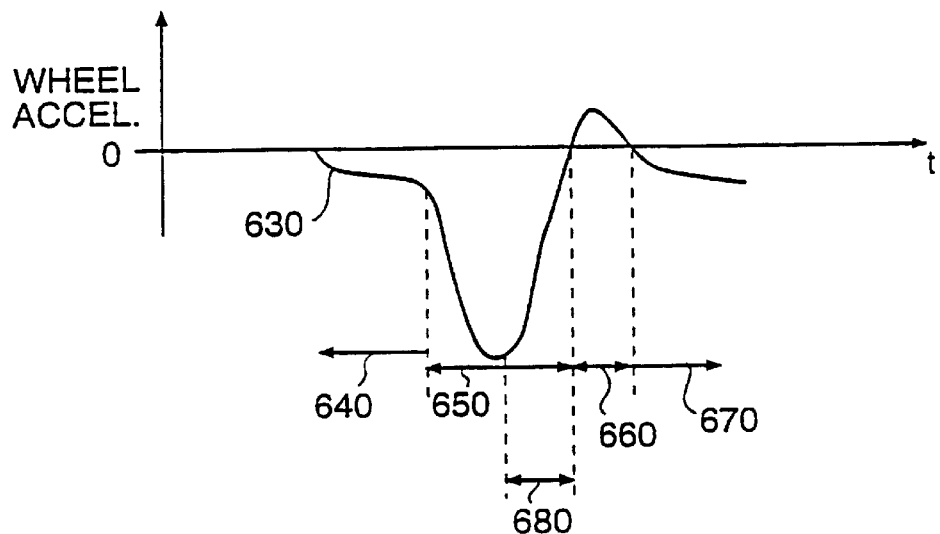
Figure 6C:
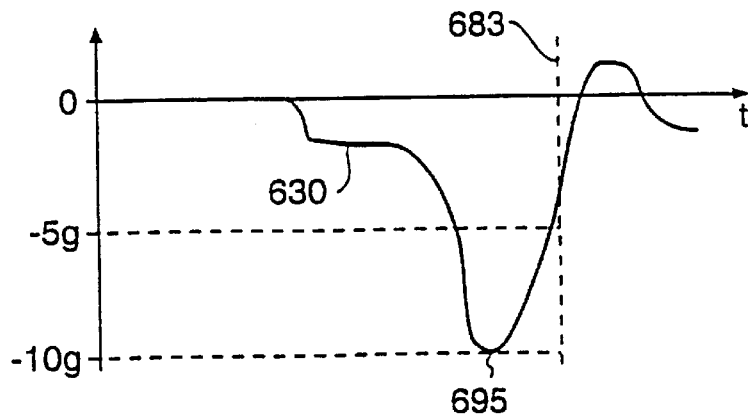

FIGS. 6A–6C show the use of a maximum wheel deceleration value during a dump mode in order to solve the problem discussed above. FIG. 6a shows the wheel speed 610 as a function of time, and the wheel speed reference 620 as a function of time. FIG. 6B is a plot of the wheel acceleration 630, with an Apply Cycle indicated by area 640, a Dump Cycle indicated by area 650, a Hold Cycle indicated by area 660, and another Apply Cycle indicated by area 670.

In a problem area, indicated by area 680 in FIG. 6B, the wheel acceleration becomes less negative and the magnitude of the error signal $e_{decel}$ is reduced. In order to eliminate the possibility of having an unwanted apply to occur during the dump cycle, a maximum capture routine captures the maximum wheel deceleration and holds the captured value. The captured maximum wheel deceleration is compared to the current wheel deceleration, and when the current wheel deceleration is less than one-half of the magnitude of the captured maximum wheel deceleration, the hold mode is entered from the dump mode.

Thus, in this situation, the hold mode is entered before the wheel acceleration becomes positive, which is different from the previous approach described earlier. FIG. 6C shows a point 683 where the current wheel deceleration is less than one-half the magnitude of the captured maximum wheel deceleration. At that point 683, the hold mode is entered. For example, if the maximum wheel deceleration is −10 g, then at the point when the wheel deceleration becomes less than −5 g, the hold mode is entered. During the time when the current wheel deceleration is greater than one-half the magnitude of the captured maximum wheel deceleration up to the time point 683, the captured value is used in the pressure dump command. With this approach, the hold mode is entered sooner than in the case where the wheel acceleration being greater than zero is used to trigger the hold mode from the dump mode. This is a desirable effect, since it desired to dump as little pressure as possible during a dump cycle, in order to minimize stopping distance while achieving a stable braking system.

Figure 7:
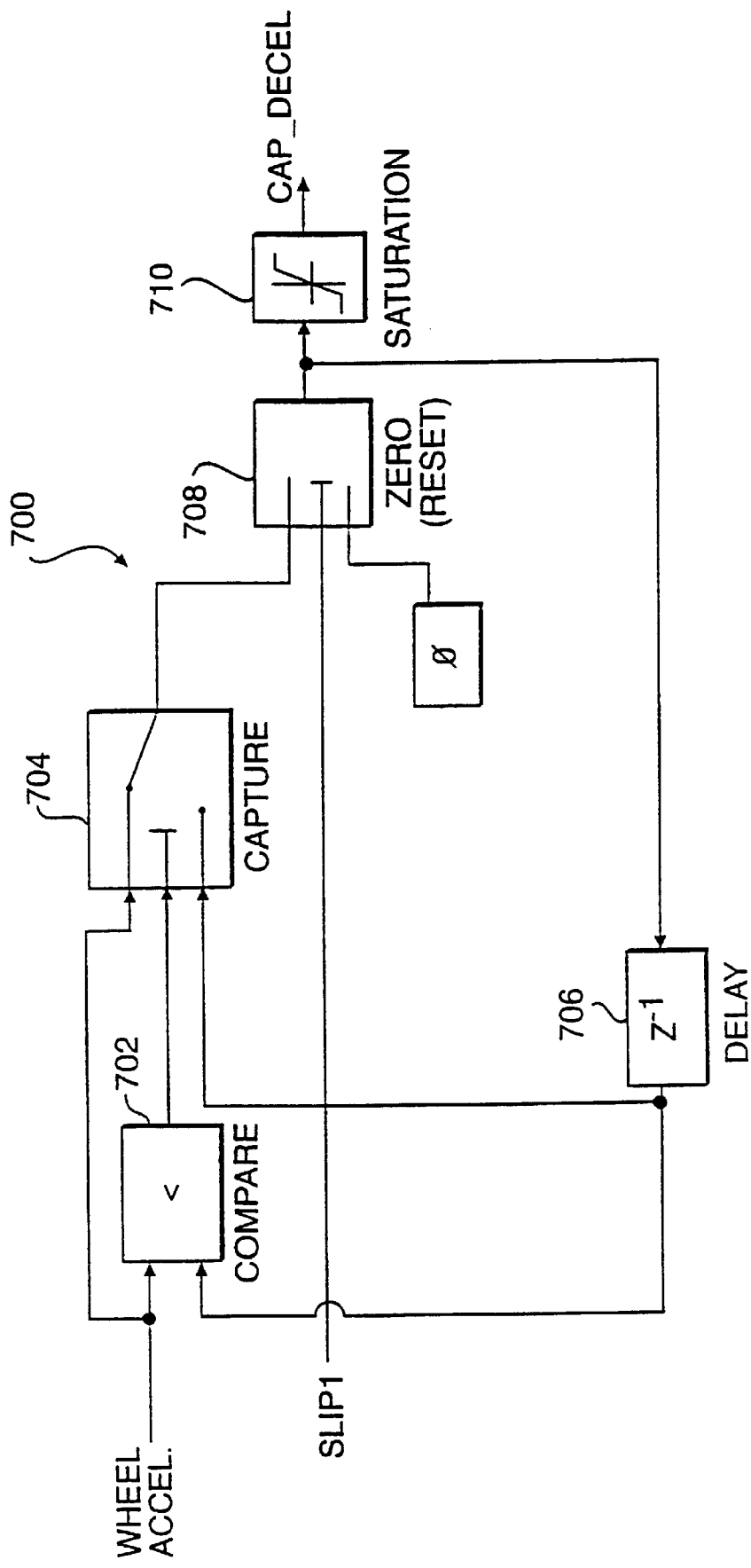
FIG. 7 is a block diagram of a maximum capture device that can be utilized in the system according to the invention.

With this maximum wheel deceleration capture approach, the maximum capture routine is reset to zero before the next departure. FIG. 6C shows the value 695 of the maximum wheel deceleration being captured and held. This value 695 is used as the wheel deceleration value in the pressure dump command for as long as the wheel acceleration is less than zero. FIG. 7 give in block diagram form an exemplary implementation of the maximum deceleration capture device 700 that can be used in the invention. Device 700 includes a Compare Element 702, a Capture Element 704, a Delay Element 706, a Zero (Reset) Element 708, and a Saturation Element 710. Saturation Element 710 limits the output between zero and the maximum wheel acceleration desired to contribute to the pressure dump command (i.e., −200 m/sec² to 0).

When in the hold mode, the previously computed $\Delta V$ is used as the new $\Delta V$, and hence, as long as the wheel speed rate is greater than zero (i.e., the wheel is not decelerating), $\Delta V$ is held at a constant value. Since during the hold mode $V_{cmd}$ is also constant (since ABS is active), the commanded voltage, V, will remain constant.

The hold mode can also be entered from the dump mode when excessive dumping occurs. In this case, a periodic hold occurs every so often so as to interrupt the dump cycle and allow the wheel to recover. The hold mode is needed in order to prevent the error terms in the PI dump mode from reducing pressure more than is necessary for wheel recovery.

While embodiments have been described herein, modification of the described embodiments may become apparent to those of ordinary skill in the art, following the teachings of the invention, without departing from the scope of the invention as set forth in the appended claims. For example, while the above explanation of the system and method of the invention was given for an ABS system, the system and method of the invention can be used equally as well for a TC or VSC system.

What is claimed is:

1. A method for brake control of a vehicle, comprising the steps of:

determining a wheel speed for each wheel of the vehicle;

determining a vehicle speed;

determining when brakes are activated by a user of the vehicle;

determining when the wheel speed for at least one of the wheels of the vehicle is different from the determined vehicle speed by at least a fixed amount;

when the wheel speed for the at least one wheel is determined to be different from the determined vehicle speed by at least the fixed amount when the brakes are activated by the user, lessening an amount of brake pressure applied to brakes for the at least one wheel according to a proportional plus integral control, and capturing a maximum wheel deceleration while wheel speed is different from the determined vehicle speed by at least the fixed amount;

comparing the magnitude of a current wheel deceleration and the magnitude of the captured maximum wheel deceleration; and entering a hold mode from the dump mode when the magnitude of the current wheel deceleration is less than one half of the magnitude of the captured maximum wheel deceleration; and when the wheel speed for the at least one wheel is determined to not be different by at least the fixed amount when the brakes are activated by the user, applying brake pressure at an exponential rate.

2. A method for brake control of a vehicle, comprising the steps of:

determining a wheel speed for each wheel of the vehicle;

determining a vehicle speed;

determining when brakes are activated by a user of the vehicle;

determining when the wheel speed for at least one of the wheels of the vehicle is different from the determined vehicle speed by at least a fixed amount;

when the wheel speed for the at least one wheel is determined to be different from the determined vehicle speed by at least the fixed amount when the brakes are activated by the user, lessening an amount of brake pressure applied to brakes for the at least one wheel according to a proportional plus integral control wherein the amount of lessening of brake pressure applied to the brakes for the at least one wheel according to a proportional plus integral control is done in accordance with the equation $$\Delta P = (e_{slip} * k_p + e_{decel} * k_d) + \Sigma e_{slip} * k_i;$$

and when the wheel speed for the at least one wheel is determined to not be different by at least the fixed amount when the brakes are activated by the user, applying brake pressure at an exponential rate.

3. A method of controlling the brakes of a vehicle comprising modulating pressure applied to the brakes during braking in accordance with the equation $$\Delta P = (e_{slip} * k_p + e_{decel} * k_d) + \Sigma e_{slip} * k_i.$$

4. A method for controlling a brake system of a vehicle, comprising the steps of:

entering a dump mode for dumping brake pressure from the brake system, the dump mode being entered based on a wheel speed being different from a vehicle speed by at least a fixed amount;

when in the dump mode, calculating a wheel deceleration;

entering a hold mode from the dump mode when the wheel is no longer decelerating; and reentering the dump mode from the hold mode if the wheel begins to decelerate and the wheel speed is still different from the vehicle speed by at least the fixed amount.

5. A method of applying brake pressure during a brake apply cycle, comprising the steps of:

a) applying the brake pressure at a first exponential rate if a wheel speed is determined to be different from a wheel speed reference by less than a fixed amount;

b) applying the brake pressure at a linear rate if the wheel speed is still different from the wheel speed reference by less than the fixed amount, more than a first fixed time period has elapsed since beginning to apply the brake pressure at the first exponential rate, and a desired brake pressure has not been reached, the linear rate being applied at a starting point corresponding to an ending point at which the brake pressure was applied at the first exponential rate; and c) applying the brake pressure at a second exponential rate if the wheel speed is still different from the wheel speed reference by less than the fixed amount, more than a second time period has elapsed since beginning to apply the brake pressure at the linear rate, and the desired brake pressure has not been reached, the second exponential rate being applied at a starting point corresponding to an ending point at which the brake pressure was applied at the linear rate.

6. The method according to claim 5 wherein the second exponential rate is a rate based on a squared value of an apply time.

7. The method according to claim 5 wherein the second exponential rate is an exponentially increasing rate.

* * * * *